US011478753B2

(12) United States Patent
Suganuma et al.

(10) Patent No.: US 11,478,753 B2
(45) Date of Patent: Oct. 25, 2022

(54) HOLLOW FIBER MEMBRANE MODULE AND PRODUCTION METHOD THEREFOR, AND EPOXY RESIN USED IN HOLLOW FIBER MEMBRANE AND PRODUCTION METHOD

(71) Applicant: DIC Corporation, Tokyo (JP)

(72) Inventors: Youhei Suganuma, Chiba (JP); Kazumi Oi, Chiba (JP); Tsugio Tomura, Chiba (JP); Makoto Kimura, Chiba (JP)

(73) Assignee: DIC CORPORATION, Tokyo (JP)

( * ) Notice: Subject to any disclaimer, the term of this patent is extended or adjusted under 35 U.S.C. 154(b) by 483 days.

(21) Appl. No.: 16/313,842

(22) PCT Filed: Jun. 27, 2017

(86) PCT No.: PCT/JP2017/023502
§ 371 (c)(1),
(2) Date: Dec. 27, 2018

(87) PCT Pub. No.: WO2018/003774
PCT Pub. Date: Jan. 4, 2018

(65) Prior Publication Data
US 2019/0151801 A1   May 23, 2019

(30) Foreign Application Priority Data
Jun. 29, 2016   (JP) .............................. JP2016-128865

(51) Int. Cl.
*B01D 53/22* (2006.01)
*B01D 63/02* (2006.01)
(Continued)

(52) U.S. Cl.
CPC ........... *B01D 63/021* (2013.01); *B01D 19/00* (2013.01); *B01D 19/0031* (2013.01);
(Continued)

(58) Field of Classification Search
CPC ................ B01D 63/00; B01D 2313/21; B01D 19/0031; B01D 63/021; B01D 2313/20;
(Continued)

(56) References Cited

U.S. PATENT DOCUMENTS 5,470,469 A    11/1995  Eckman
6,648,945 B1 * 11/2003  Takeda ............... B01D 19/0031
                                                    95/46
(Continued)

FOREIGN PATENT DOCUMENTS

CN    1063054 A    7/1992
CN    1345255 A    4/2002
(Continued)

OTHER PUBLICATIONS

Hexion "EPIKOTE Resin 828" 2pgs Feb. 1, 2007 <https://www.hexion.com/en-US/product/epikote-resin-828> (Year: 2007).*
(Continued)

*Primary Examiner* — Anthony R Shumate
(74) *Attorney, Agent, or Firm* — McDermott Will & Emery LLP

(57) ABSTRACT

Provided is a hollow fiber membrane module that exhibits excellent durability even when a chemical such as a radical polymerizable compound is used for a separation or mixing process. Also provided is a method for producing the hollow fiber membrane module in a highly productive manner. More specifically, there is provided a hollow fiber membrane module at least including a tubular body, a cap, a hollow fiber membrane, and an end seal portion, wherein at least a liquid contacting portion of the end seal portion is sealed with a cured product of a curable resin composition including an epoxy resin, and wherein the epoxy resin includes a polyglycidyl ether of a polycondensate of an aromatic compound containing a phenolic hydroxyl group and an
(Continued)

aromatic compound containing a formyl group and a phenolic hydroxyl group, and there is provided a method for producing the module.

10 Claims, 4 Drawing Sheets

(51) Int. Cl.

| | | |
|---|---|---|
| *B41J 2/19* | (2006.01) | |
| *C08G 59/32* | (2006.01) | |
| *B41J 2/175* | (2006.01) | |
| *B01D 63/00* | (2006.01) | |
| *B01D 19/00* | (2006.01) | |

(52) U.S. Cl.
CPC ............ *B01D 63/00* (2013.01); *B01D 63/02* (2013.01); *B41J 2/175* (2013.01); *B41J 2/19* (2013.01); *C08G 59/32* (2013.01); *B01D 2313/04* (2013.01); *B01D 2313/20* (2013.01); *B01D 2313/21* (2013.01)

(58) Field of Classification Search
CPC .... B01D 2313/04; B01D 19/00; B01D 63/02; C08G 59/32; B41J 2/175; B41J 2/19
See application file for complete search history.

(56) References Cited

U.S. PATENT DOCUMENTS

| | | | |
|---|---|---|---|
| 9,248,408 B2 | 2/2016 | Kanougi et al. | |
| 9,816,660 B2* | 11/2017 | Schwert | B29C 65/48 |
| 2003/0162868 A1* | 8/2003 | Stretanski | C08L 23/12 |
| | | | 524/100 |
| 2010/0199840 A1* | 8/2010 | Yamaoka | B01D 63/022 |
| | | | 95/50 |
| 2013/0145962 A1* | 6/2013 | Gupta | C08K 5/34 |
| | | | 106/287.21 |
| 2015/0315465 A1* | 11/2015 | Gupta | C08K 5/105 |
| | | | 524/100 |
| 2016/0145427 A1* | 5/2016 | Eng | C08K 5/357 |
| | | | 524/100 |
| 2016/0236151 A1* | 8/2016 | Liu | B01D 63/023 |
| 2016/0257812 A1* | 9/2016 | Fujimura | C08J 5/24 |
| 2016/0297921 A1* | 10/2016 | Shindo | C08J 5/24 |
| 2017/0282126 A1* | 10/2017 | Nakamoto | B01D 63/022 |
| 2019/0151801 A1* | 5/2019 | Suganuma | B01D 63/023 |
| 2020/0148847 A1* | 5/2020 | Oka | C08G 59/245 |

FOREIGN PATENT DOCUMENTS

| | | |
|---|---|---|
| CN | 1392802 A | 1/2003 |
| CN | 201284246 Y | 8/2009 |
| EP | 1174175 A1 | 1/2002 |
| JP | H2-0245016 A | 9/1990 |
| JP | H02293025 A | 12/1990 |
| JP | H05-57152 A | 3/1993 |
| JP | H6-277460 A | 10/1994 |
| JP | H9-0187629 A | 7/1997 |
| JP | 2000-342934 A | 12/2000 |
| JP | 2001-192435 A | 7/2001 |
| JP | 2010-36183 A | 2/2010 |
| JP | 2012-193217 A | 10/2012 |
| JP | 2013-208544 A | 10/2013 |
| WO | 2015/146504 A1 | 10/2015 |

OTHER PUBLICATIONS

Sigma "Epichlorohydrin 99% 106-89-8" 7pages <https://www.sigmaaldrich.com/US/en/product/aldrich/e1055> retrieved Oct. 4, 2021 (Year: 2021).*
International Search Report corresponding to International Patent Application No. PCT/JP2017/023502, dated Aug. 8, 2017.
International Preliminary Report and Written Opinion corresponding to International Patent Application No. PCT/JP2017/023502, dated Jan. 1, 2019.
Extended Search Report issued in corresponding European Patent Application No. 17820128.1, dated Jan. 23, 2020.
Chinese Office Action issued in corresponding Chinese Patent Application No. 201780040234.0, dated Jan. 21. 2021, with English translation.

* cited by examiner

HOLLOW FIBER MEMBRANE MODULE AND PRODUCTION METHOD THEREFOR, AND EPOXY RESIN USED IN HOLLOW FIBER MEMBRANE AND PRODUCTION METHOD

CROSS REFERENCE

This application is the U.S. National Phase under 35 U.S.C. § 371 of International Application No. PCT/JP2017/023502, filed on Jun. 27, 2017, which claims the benefit of Japanese Application No. 2016-128865, filed on Jun. 29, 2016, the entire contents of each are hereby incorporated by reference.

TECHNICAL FIELD

The present invention relates to a hollow fiber membrane module used for separating a liquid from another substance or mixing a liquid with another substance via hollow fiber membranes, specifically for gas-liquid separation, gas-liquid mixing, solid-liquid separation, solid-liquid mixing, liquid-liquid separation, liquid-liquid mixing, or the like. The present invention also relates to a method for producing the hollow fiber membrane module.

BACKGROUND ART

A hollow fiber membrane module typically has a structure obtained by housing both ends of multiple hollow fiber membranes in a tubular body with a sealant, bonding or securing two end portions to the inner wall of the tubular body, and then capping both ends of the tubular body with caps. A hollow fiber membrane module functions as follows. A first fluid and a second fluid are isolated from each other, located inside and outside the hollow fiber membranes. Between the fluids, one of the substances or a component included in one of the substances migrates through the hollow fiber membranes to the other, and accordingly separation or mixing is accomplished.

Hollow fiber membrane modules including such hollow fiber membranes have been used in a variety of fields in recent years. The fields are diverse, and examples thereof include industrial fields of, for example, water treatment membranes for household water purifiers, industrial water purifiers, and the like, medical fields of blood treatment membranes for artificial lungs and the like, membranes for dissolving carbon dioxide gas, ammonia gas, or the like in purified water, which are for use in cleaning, dicing, and the like of silicon wafers in production, and membranes for degassing of liquid chemicals for developing processes for semiconductors, ink jet printers, liquid crystal production processes, and the like. In addition, expanding the types of liquid components that can be treated is also desired, and there is an increasing demand for durability against organic solvents that have been untreatable in the past for the reason that the solvents penetrate into the seal portion, which is a constituent of a hollow fiber membrane module, and causes swelling.

For example, a degassing membrane module for semiconductor developing agents is proposed (Patent Literature 1), which is an example of the technical field related to technologies for degassing a liquid chemical to remove dissolved gas by using hollow fiber membranes. Disclosed in Patent Literature 1 is a hollow fiber membrane module for degassing in which the housing section and/or the end cap sections, the hollow fiber separation membranes, and at least the liquid contacting portion of the end seal portion are made from a material having resistance to a developing agent. The seal portion of the hollow fiber membrane module for degassing is formed from a curable resin composition including an epoxy resin. In the material, a bisphenol A glycidyl ether-type epoxy resin, which is liquid at room temperature, is included as the epoxy resin, and a polyamide amine resin curing agent or a cycloaliphatic polyamine resin curing agent is included as the curing agent.

However, although the material exhibits a certain degree of durability against alkaline liquid chemicals, such as semiconductor developing agents, the material is not considered to have sufficient durability against alcohol, photoresist, ink-jet printer ink, and liquid chemicals used for liquid crystals or the like, and there have been some cases in which the seal portion, which is formed by using and curing the material, experiences swelling, which causes cracking in the tubular body to which the seal portion is secured and results in leakage of the liquid chemical.

In view of the above, a hollow fiber membrane module has been proposed (Patent Literature 2) in which the seal portion is formed from a material including a polysulfide-modified epoxy resin, a bisphenol A epoxy resin, and a $BF_3$-modified amine complex. It is known that the hollow fiber membrane module exhibits excellent chemical resistance to a photoresist thinner (propylene glycol monomethyl ether/propylene glycol monomethyl ether acetate=70/30 (wt %)), which has a strong effect in causing swelling of seal portions. However, even the material has not been considered to have sufficient durability because, in recent years, liquid chemicals used have often contained a component that is different from the above-mentioned liquid chemical (organic solvent) and which has an effect in causing dissolution or swelling of seal portions. Examples of the component include radical polymerizable compounds, such as (meth)acrylate and n-vinyl compounds. As a result, there have been occasions in which, when used over a long period of time or under harsh treatment conditions, the seal portion experiences swelling, which causes cracking in the tubular body to which the seal portion is secured and results in leakage of the liquid chemical.

CITATION LIST

Patent Literature

PTL 1: Japanese Unexamined Patent Application Publication No. 9-187629
PTL 2: Japanese Unexamined Patent Application Publication No. 2000-342934

SUMMARY OF INVENTION

Technical Problem

An object of the present invention is to provide a hollow fiber membrane module at least including a tubular body, caps, hollow fiber membranes, and end seal portions, the hollow fiber membrane module having excellent durability such that, even when a component that has an effect in causing dissolution or swelling of the seal portion, such as a radical polymerizable compound, is used, dissolution and swelling of the seal portion is inhibited and accordingly the occurrence of cracking in the tubular body is inhibited, and another object is to provide a method for producing the hollow fiber membrane module in a highly productive manner.

Solution to Problem

The present inventors diligently performed tests and studies to solve the problems described above and, as a result, discovered that the problems described above can be solved by forming at least the liquid contacting portion of the end seal portion from the cured product of a curable resin composition containing a polyglycidyl ether of a polycondensate of an aromatic compound containing a phenolic hydroxyl group and an aromatic compound containing a formyl group and a phenolic hydroxyl group. Accordingly, the present invention was made.

That is, the present invention relates to a hollow fiber membrane module at least including a tubular body, a cap, a hollow fiber membrane, and an end seal portion. In the hollow fiber membrane module, at least a liquid contacting portion of the end seal portion is sealed with a cured product of a curable resin composition including an epoxy resin, and the epoxy resin includes a polyglycidyl ether of a polycondensate of an aromatic compound containing a phenolic hydroxyl group and an aromatic compound containing a formyl group and a phenolic hydroxyl group.

Furthermore, the present invention relates to a method for producing a hollow fiber membrane module at least including a tubular body, caps, a hollow fiber membrane, and end seal portions, the method including loading the hollow fiber membrane into the tubular body, sealing end portions of the hollow fiber membrane to the tubular body by curing a curable resin composition including an epoxy resin, and attaching the caps to both ends of the tubular body. In the curable resin composition, the epoxy resin includes a polyglycidyl ether of a polycondensate of phenol and hydroxybenzaldehyde.

Furthermore, the present invention relates to an epoxy resin for use in a hollow fiber membrane module at least including a tubular body, a cap, a hollow fiber membrane, and an end seal portion, the epoxy resin being for use in sealing an end portion of the hollow fiber membrane to the tubular body. The epoxy resin includes a polyglycidyl ether of a polycondensate of phenol and hydroxybenzaldehyde.

Advantageous Effects of Invention

The present invention provides a hollow fiber membrane module at least including a tubular body, caps, hollow fiber membranes, and end seal portions, the hollow fiber membrane module having excellent durability such that, even when a component that has a strong effect in causing dissolution or swelling of the seal portion, such as a radical polymerizable compound, is used, dissolution and swelling of the seal portion is inhibited and accordingly the occurrence of cracking in the tubular body is inhibited, and the present invention provides a method for producing the hollow fiber membrane module in a highly productive manner.

DESCRIPTION OF EMBODIMENTS

Figure 1:
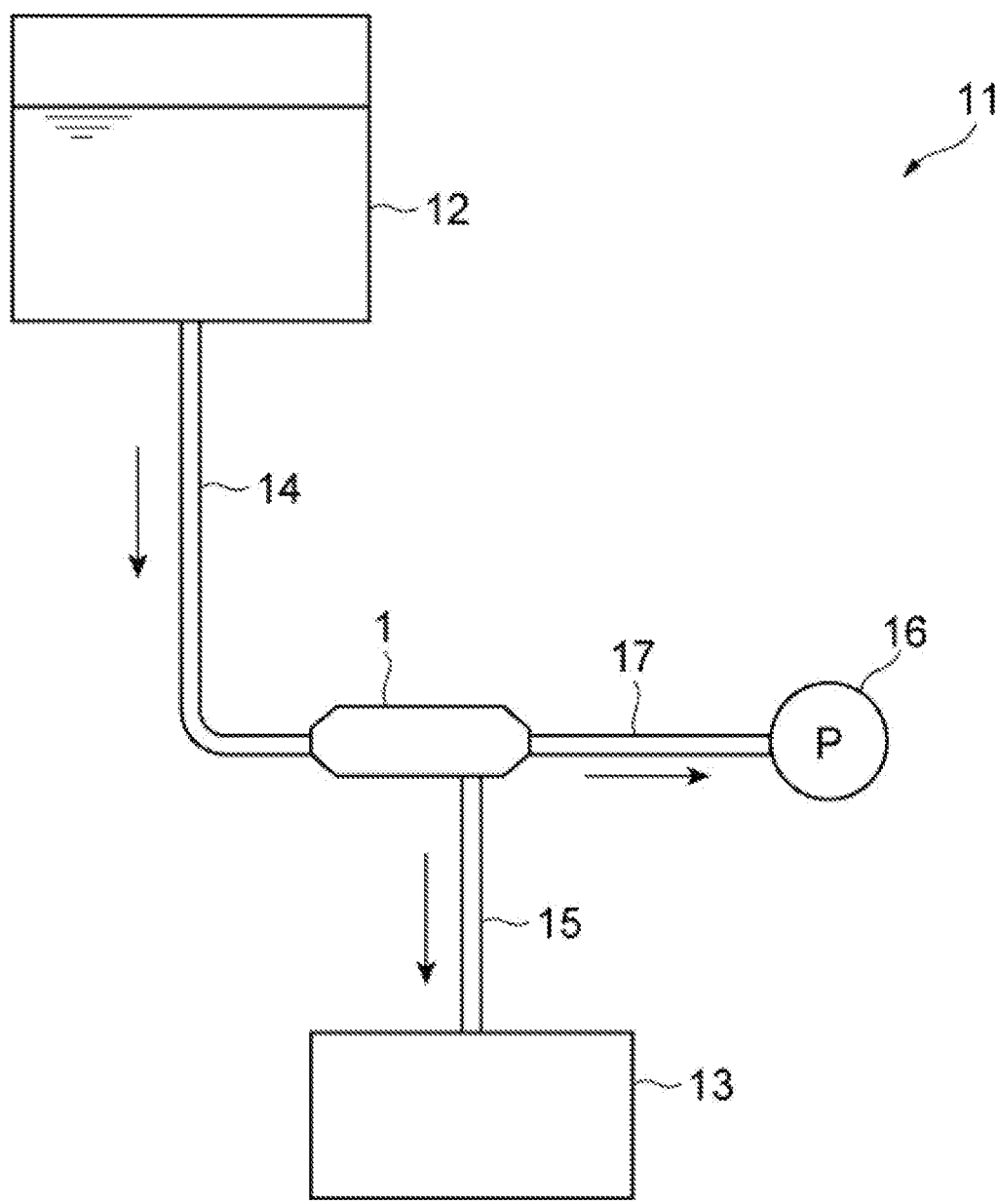
FIG. 1 is a schematic diagram of an ink jet printer according to an embodiment.

A hollow fiber membrane module of the present invention at least includes a tubular body, caps, hollow fiber membranes, and end seal portions. At least a liquid contacting portion of the end seal portion is sealed with the cured product of a curable resin composition including an epoxy resin. The epoxy resin includes a polyglycidyl ether of a polycondensate of an aromatic compound containing a phenolic hydroxyl group and an aromatic compound containing a formyl group and a phenolic hydroxyl group.

First, the hollow fiber membrane module of the present invention will be described. The hollow fiber membrane module of the present invention at least includes a tubular body, caps, hollow fiber membranes, and end seal portions. At least the liquid contacting portion of the end seal portion is sealed with the cured product of the curable resin composition.

The tubular body is the part in which hollow fiber membranes are to be housed. The tubular body has a cylindrical shape, and both end portions of the tubular body are open. A cap is attached to an open end portion at one end of the tubular body, and a cap is also attached to an open end portion at the other end of the tubular body. Attaching the caps to the tubular body can be accomplished by, for example, threaded engagement, fitting engagement, adhesive bonding, or the like. An opening for supplying or discharging fluid to or from the interior of the module may be formed in a side wall of the tubular body. The opening formed in a side wall of the tubular body may have a cylindrical shape and may be coupled to a pipe for supplying or discharging fluid to or from the module, by threaded engagement, fitting engagement, adhesive bonding, or the like.

Specific examples of materials that may be used in the tubular body and/or the caps of the hollow fiber membrane module of the present invention include, as representative examples, ABS resins, polyethylene, polypropylene, poly-4-methyl-pentene-1, epoxy resins, polyacrylonitrile, polysulfone, polyethersulfone, polyetherimide, polyallyl sulfone, polyphenylene ethers, polystyrene, clean vinyl chloride, fluorocarbon resins, and stainless steels. Such metals and plastics have good mechanical properties, creep resistance, and hydrolyzability and have high resistance to acids and alkalis. Polysulfone, polyethersulfone, polyetherimide, polyallyl sulfone, polyphenylene ethers, polypropylene, fluorocarbon resins, and the like are preferable. Particularly, engineering plastics, such as polysulfone, polyethersulfone, polyetherimide, polyallyl sulfone, and polyphenylene ethers, and fluorocarbon resins are preferable because such materials do not dissolve into a liquid in large amounts.

The hollow fiber membrane included in the hollow fiber membrane module of the present invention is secured, at least at one end, to a housing via a seal portion (referred to as an end seal portion in the present invention). The hollow fiber membrane may be a hollow fiber membrane bundle that is formed of a plurality of hollow fiber membranes bundled together on an extension and which is housed in a housing.

The hollow fiber membrane used in the present invention may be produced from a resin known in the art. Examples of the resin include polysulfone, polyethersulfone, silicone resins, polyacrylonitrile, polyethylene, polypropylene, poly-4-methyl-pentene-1, and fluorocarbon resins (e.g., polyvinylidene fluoride).

The membrane structure employed for the hollow fiber membrane module of the present invention may be any of the following: a porous structure, a homogeneous structure, and an asymmetric structure. The porous structure has pores substantially extending from the inner surface of the hollow fiber to the outer surface thereof. The homogeneous structure is free of pores substantially extending from the inner surface of the hollow fiber to the outer surface thereof. The asymmetric structure is, for example, a structure having, on the surface of a porous membrane, a skin layer free of pores substantially extending therethrough. As used herein, the "asymmetric membrane" is a general term for membranes having a non-symmetrical structure, such as non-homogeneous membranes having a non-uniform membrane structure and composite membranes made by, for example, bonding a porous membrane and a homogeneous membrane together. For example, in the case that the hollow fiber membrane can be used for gas-liquid separation and the interfacial tension of a liquid is lower than that of the material of the membrane because of inclusion of, for example, a surfactant in the liquid, the liquid may flow through pores substantially extending therethrough and leak on the gas outlet side. In such a case, it is preferable that the hollow fiber membrane be of an asymmetric-structure membrane or a homogeneous-structure membrane, either of which is free of pores substantially extending from the inner surface of the hollow fiber membrane to the outer surface thereof. Furthermore, regarding homogeneous membranes and asymmetric membranes, the membranes per se typically have a low gas permeation rate compared with porous membranes, and therefore, in view of degassing performance, it is preferable to use a hollow fiber membrane formed from a material having a high gas permeation rate, and, for example, a non-homogeneous hollow fiber membrane of poly-4-methyl-pentene-1 and a composite membrane of, for example, a porous membrane and a silicone resin are more preferable.

In the present invention, in the end seal portion, at least the liquid contacting portion is formed of the cured product of a curable resin composition including an epoxy resin.

The end seal portions, formed of the cured product of the curable resin composition including an epoxy resin, secure both ends of the hollow fibers to the tubular body, with the hollow fiber membranes loaded in the tubular body. In the case that the hollow fiber membrane module is used for liquid-liquid separation or mixing, the liquid contacting portion of the end seal portion may be located either on the cap-side surface or on the tubular body-side surface. In the case that the hollow fiber membrane module is used for liquid-gas separation or mixing, the liquid contacting portion is located, for internal perfusion modules, on the cap-side surface, or, for external perfusion modules, on the tubular body-side surface.

In the present invention, the liquid contacting portion, exclusively, may be sealed with the cured product of the curable resin composition including an epoxy resin, whereas the other regions may be further sealed with any suitable material other than the curable resin composition, to provide mechanical strength and bond strength of the tubular body and the seal portion. Of course, it is possible to perform sealing only with the resin used for the liquid contacting portion.

The epoxy resin included in the curable resin composition used for the liquid contacting portion includes a polyglycidyl ether of a polycondensate of an aromatic compound (A) containing a phenolic hydroxyl group and an aromatic compound (B) containing a formyl group and a phenolic hydroxyl group.

The aromatic compound (A) containing a phenolic hydroxyl group (hereinafter simply referred to as the "aromatic compound (A)") may be an aromatic compound containing a hydroxyl group bonded to a carbon atom that is a constituent of the aromatic ring of the compound. Examples of the aromatic ring include benzene rings, naphthalene rings, and anthracene rings. The aromatic ring may further include, in addition to a hydroxyl group, one or more substituents: alkyl groups, alkoxy groups, and halogen atoms. Not that the "aromatic compound (A) containing a phenolic hydroxyl group" excludes an aromatic compound containing a formyl group bonded to a carbon atom that is a constituent of the aromatic ring.

The aromatic compound (B) containing a formyl group and a phenolic hydroxyl group (hereinafter simply referred to as the "aromatic compound (B)") may be an aromatic compound containing a hydroxyl group and a formyl group bonded to respective at least two carbon atoms that are constituents of the aromatic ring of the compound. Examples of the aromatic ring include benzene rings, naphthalene rings, and anthracene rings. The aromatic ring may further include, in addition to a hydroxyl group and a formyl group, one or more substituents: alkyl groups, alkoxy groups, and halogen atoms.

Furthermore, specific examples of the aromatic compound (A) and the aromatic compound (B) are represented, respectively, by general formula (1) and (2) below.

[Chem. 1]

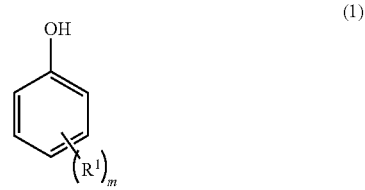

(1)

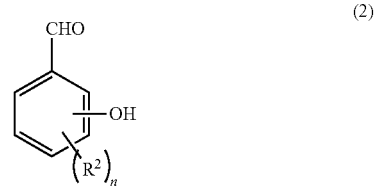

(2)

In the formulas, $R^1$ and $R^2$ are each independently a hydrogen atom, a hydrocarbon group having 1 to 4 carbon atoms, an alkoxy group having 1 to 4 carbon atoms, or a halogen atom, m is an integer from 1 to 3, and n is an integer from 1 to 4.

Here, examples of the hydrocarbon group having 1 to 4 carbon atoms include methyl groups, ethyl groups, propyl groups, and butyl groups. Examples of the alkoxy group having 1 to 4 carbon atoms include methoxy groups, ethoxy groups, propoxy groups, and butoxy groups. Examples of the halogen atom include a fluorine atom, a chlorine atom, and a bromine atom. Of these, it is preferable that all of $R^1$ and $R^2$ be hydrogen atoms because an epoxy resin having an excellent balance of melt viscosity and the thermal resistance of the cured product can be obtained.

In the aromatic compound (B), the phenolic hydroxyl group may be in the ortho-, meta-, or para-position relative to the formyl group. Of these, it is preferable that the hydroxyl group be in the ortho-position relative to the formyl group because high reactivity with the aromatic compound (A) is achieved.

It is preferable that the polymerization reaction between the aromatic compound (A) and the aromatic compound (B) take place in the presence of an acidic catalyst because the reaction proceeds efficiently. Examples of the acidic catalyst include inorganic acids, such as hydrochloric acids, sulfuric acids, and phosphoric acids; organic acids, such as methanesulfonic acids, para-toluene sulfonic acids, and oxalic acids; and Lewis acids, such as boron trifluoride, anhydrous aluminum chloride, and zinc chloride. Here, it is preferable that the amount of the polymerization catalyst used be within a range of 0.1 to 5 mass % relative to the total mass of the reaction ingredients.

Typically, the polymerization reaction between the aromatic compound (A) and the aromatic compound (B) is carried out under temperature conditions of 100 to 200° C. for 1 to 20 hours. The reaction may be carried out in an organic solvent as necessary. The organic solvent used here is not particularly limited provided that the organic solvent can be used under the above-mentioned temperature conditions. Specifically, examples of the organic solvent include methyl cellosolve, ethyl cellosolve, toluene, xylene, and methyl isobutyl ketone. In the case that such an organic solvent is used, it is preferable that the organic solvent be present in an amount within a range of 10 to 500 mass % relative to the total mass of the reaction ingredients.

With regard to the combination ratio between the aromatic compound (A) and the aromatic compound (B) for polymerization reaction, it is preferable that the aromatic compound (B) be present in an amount within a range of 0.01 to 0.9 moles per mole of the aromatic compound (A) because an epoxy resin having an excellent balance of melt viscosity and the thermal resistance of the cured product can be obtained.

In the polymerization reaction between the aromatic compound (A) and the aromatic compound (B), any of a variety of antioxidants and reducing agents may be used to inhibit coloring of the reaction product. Examples of the antioxidant include hindered phenol compounds, such as 2,6-dialkylphenol derivatives; divalent sulfur compounds; and phosphite ester compounds, each of which contains a trivalent phosphorus atom. Examples of the reducing agent include hypophosphorous acids, phosphorous acids, thiosulfuric acids, sulfurous acids, hydrosulfite, salts of these, and zinc.

After completion of the polymerization reaction between the aromatic compound (A) and the aromatic compound (B), unreacted reaction ingredients, by-products, and the like can be distilled off.

Next, the polycondensate obtained above is reacted with an epihalohydrin to obtain the target epoxy resin, which includes a polyglycidyl ether of the polycondensate. For the reaction for obtaining the polyglycidyl ether, a method may be as follows. An epihalohydrin and the polycondensate are used in a ratio such that, for example, the epihalohydrin is present in an amount ranging from 2 to 10 moles per mole of phenolic hydroxyl groups in the polycondensate. The reaction is allowed to take place at a temperature of 20 to 120° C. for 0.5 to 10 hours while a basic catalyst in an amount of 0.9 to 2.0 moles per mole of the phenolic hydroxyl groups are added at a time or at multiple times.

When implementing industrial production, one or more epihalohydrins used for preparation are all new in the first batch of the epoxy resin production, but, in the next and subsequent batches, it is preferable to use the epihalohydrin recovered from the crude reaction product in combination with one or more new epihalohydrins, which are in an amount corresponding to the amount of loss due to consumption in the reaction. Here, examples of the epihalohydrin to be used include, but are not particularly limited to, epichlorohydrin, epibromohydrin, and β-methylepichlorohydrin. Among others, epichlorohydrin is preferable because of industrial availability.

Specifically, examples of the basic catalyst include alkaline earth metal hydroxides, alkali metal carbonate salts, and alkali metal hydroxides. Among others, alkali metal hydroxides are preferable because of their excellent catalytic activity. Specifically, sodium hydroxide and potassium hydroxide, for example, are preferable.

It is preferable that the reaction between the polycondensate and an epihalohydrin be carried out in the presence of an organic solvent, which increases the reaction rate and therefore enables efficient production. Examples of the organic solvent used here include, but are not particularly limited to, ketones; such as acetone and methyl ethyl ketone; alcohol compounds, such as methanol, ethanol, 1-propyl alcohol, isopropyl alcohol, 1-butanol, secondary butanol, and tertiary butanol; cellosolves, such as methyl cellosolve and ethyl cellosolve; ether compounds, such as tetrahydrofuran, 1,4-dioxane, 1,3-dioxane, and diethoxyethane; and aprotic polar solvents, such as acetonitrile, dimethyl sulfoxide, and dimethylformamide. These organic solvents may be used alone or may be used appropriately in combination of two or more to adjust the polarity. It is also possible to use water and the organic solvent in combination.

After completion of the reaction, the reaction mixture can be washed with water, and thereafter, the unreacted epihalohydrin and organic solvent can be distilled off by distillation under heating and reduced pressure. In addition, to further reduce hydrolyzable halogens, the resulting polyglycidyl ether of the polycondensate can be subjected to a further reaction by dissolving the polyglycidyl ether in an organic solvent again and adding thereto an aqueous solution of an alkali metal hydroxide, such as sodium hydroxide or potassium hydroxide. Here, to improve the reaction rate, a phase transfer catalyst, such as a quaternary ammonium salt or a crown ether, may be present. In the case that a phase transfer catalyst is used, it is preferable that the amount of use be such that the catalyst be present in an amount of 0.1 to 3.0 parts by mass per 100 parts by mass of the epoxy resin. After completion of the reaction, the produced salt can be removed by, for example, filtration or washing with water, and the organic solvent can be distilled off under heating and reduced pressure. In this manner, the epoxy resin including a polyglycidyl ether of the polycondensate can be obtained.

The thus obtained polyglycidyl ether of the polycondensate of an aromatic compound containing a phenolic hydroxyl group and an aromatic compound containing a formyl group and a phenolic hydroxyl group is one in which the polycondensate has structural units in each of which a carbon atom that is a constituent of the aromatic ring of the aromatic compound (A) containing a phenolic hydroxyl group and/or the aromatic compound (B) containing a formyl group and a phenolic hydroxyl group is bonded to the carbon atom derived from the formyl group of the aromatic compound (B) containing a formyl group and a phenolic hydroxyl group, and in which the glycidyl groups are bonded via the oxygen atoms derived from the phenolic hydroxyl groups of the aromatic compound (A) containing a phenolic hydroxyl group and/or the aromatic compound (B) containing a formyl group and a phenolic hydroxyl group. This is a so-called resin and includes various components but at least includes structural parts represented by structural formula (3) below, which are repeating structural units.

[Chem. 2]

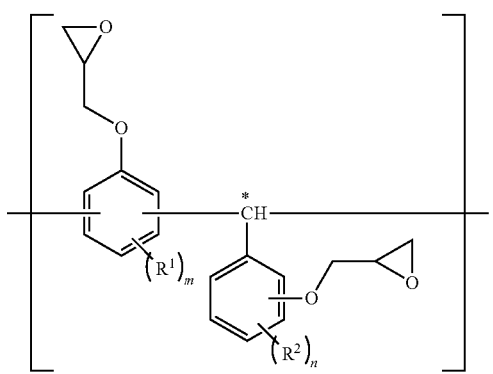

(3)

[In the formula, $R^1$ and $R^2$ are each as described above. Bonding points at which structural parts represented by structural formula (3) are linked together via the methylene group marked with an asterisk are included, and m and n are each as described above.]

The state in which "structural parts represented by structural formula (3) are linked together via the methylene group marked with an asterisk", refers to a structure represented by, for example, structural formula (4) below.

[In the formula, $R^1$ and $R^2$ are each as described above. Bonding points at which structural parts represented by structural formula (3) are linked together via the methylene group marked with an asterisk are included, and m and n are each as described above.]

The curable resin composition used for the present invention may include one or more other additional epoxy resins serving as epoxy resin components, in addition to the polyglycidyl ether of the polycondensate. The combination ratio between the epoxy resin of the present invention and one or more other epoxy resins is not particularly limited; however, preferably, one or more other epoxy resins are included such that the epoxy resin of the present invention be present in an amount within a range of not less than 30 mass % and preferably not less than 40 mass %, relative to the total mass of the epoxy resin components, so that effects of the present invention can be sufficiently produced.

The one or more other epoxy resins may be any of a variety of epoxy resins. Examples thereof include epoxy resins containing a naphthalene skeleton, such as 2,7-diglycidyloxynaphthalene, α-naphthol novolac epoxy resins, β-naphthol novolac epoxy resins, polyglycidyl ethers of α-naphthol/β-naphthol co-condensed novolac, naphthol aralkyl epoxy resins, 1,1-bis(2,7-diglycidyloxy-1-naphthyl) alkanes; bisphenol epoxy resins, such as bisphenol A epoxy resins and bisphenol F epoxy resins; biphenyl epoxy resins, such as biphenyl epoxy resins and tetramethylbiphenyl epoxy resins; novolac epoxy resins, such as phenol novolac epoxy resins, cresol novolac epoxy resins, bisphenol A novolac epoxy resins, and biphenyl novolac epoxy resins; tetraphenylethane-type epoxy resins; dicyclopentadiene-phenol addition reaction-type epoxy resins; phenol aralkyl-type epoxy resins; and phosphorus atom-containing epoxy resins. Examples of the phosphorus atom-containing epoxy resin include epoxidized products of 9,10-dihydro-9-oxa-10-phosphaphenanthrene-10-oxide (hereinafter abbreviated as "HCA"), epoxidized products of phenolic resins obtained by reacting HCA with a quinone, epoxy resins produced by

[Chem. 3]

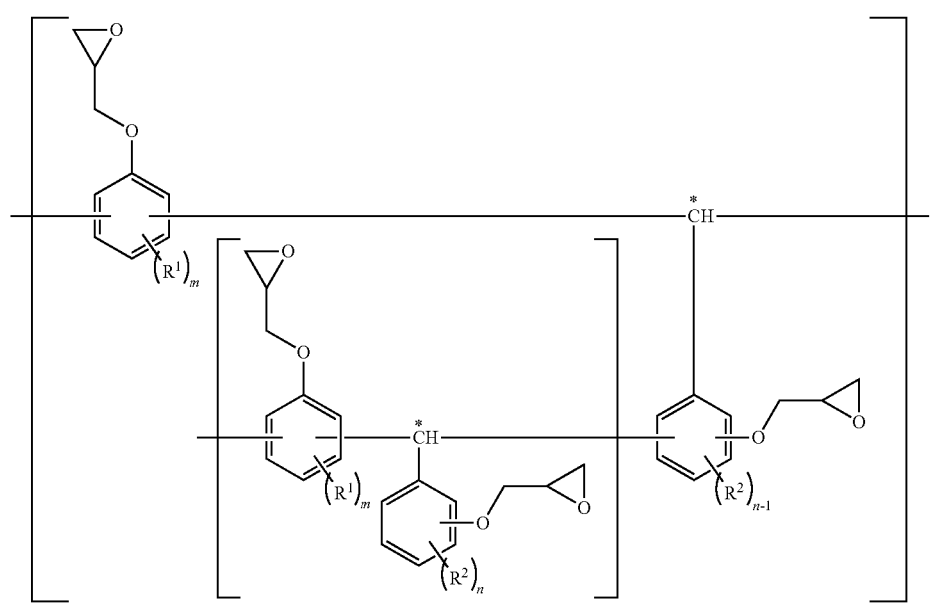

(4)

modifying a phenol novolac epoxy resin with HCA, epoxy resins produced by modifying a cresol novolac epoxy resin with HCA, and epoxy resins obtained by modifying a bisphenol A epoxy resin with a phenolic resin obtained by reacting HCA with a quinone. These may be used alone or in combination of two or more.

The melt viscosity of the epoxy resin used for the present invention is not particularly limited provided that effects of the present invention are not diminished; however, for excellent workability in production and the balance between excellent thermal resistance of the cured product and excellent chemical resistance thereof, the lower limit of melt viscosity (ICI viscosity) at 150° C. is preferably within a range of not less than 1 mPa·s and more preferably not less than 10 mPa·s, whereas the upper limit is more preferably within a range of not greater than 500 mPa·s and particularly preferably not greater than 250 mPa·s. Note that "melt viscosity (ICI viscosity) at 150° C." is defined as the value measured in accordance with ASTM D4287.

Furthermore, the epoxy equivalent weight of the epoxy resin used for the present invention is not particularly limited provided that effects of the present invention are not diminished; however, for excellent workability in production and the balance between excellent thermal resistance of the cured product and excellent chemical resistance thereof, the upper limit is preferably within a range of not greater than 230 g/eq and more preferably not greater than 190 g/eq, whereas the lower limit is more preferably within a range of not less than 150 g/eq. Note that the "epoxy equivalent weight" is defined as the value measured in accordance with JIS K 7236.

The curable resin composition used for the present invention includes a curing agent. The curing agent may be one known in the art as a curing agent for epoxy resins. Examples of the curing agent include amine-type curing agents, phenolic resin-type curing agents, acid anhydride-type curing agents, and latent curing agents. Of these, amine-type curing agents are preferable because curing at room temperature or curing at low temperatures, for example, at approximately 40° C. to approximately 50° C., can be achieved and therefore thermal degradation of the hollow fibers during curing can be inhibited.

The amine-type curing agent may be one known in the art. Examples of the amine-type curing agent include aliphatic polyamines, aromatic polyamines, heterocyclic polyamines, epoxy adducts thereof, Mannich-modified products thereof, and polyamide-modified products thereof. Specifically, examples include diethylenetriamine, triethylenetetramine, tetraethylenepentamine, m-xylenediamine, trimethylhexamethylenediamine, 2-methylpentamethylenediamine, isophoronediamine, 1,3-bis(aminomethyl)cyclohexane, bis(4-aminocyclohexyl)methane, norbornene diamine, 1,2-diaminocyclohexane, diaminodiphenylmethane, m-phenylene diamine, diaminodiphenyl sulfone, diethyl toluene diamine, trimethylene bis(4-aminobenzoate), and polytetramethylene oxide-di-p-aminobenzoate. Of these, m-xylenediamine and 1,3-bis(aminomethyl)cyclohexane may be particularly preferable because of their excellent curing properties.

The phenolic resin-type curing agent may be one known in the art, and examples thereof include bisphenols, such as bisphenol A, bisphenol F, and biphenol; trifunctional phenolic compounds, such as trihydroxyphenylmethane and 1,1,1-tris(hydroxyphenyl)ethane; phenolic novolac; and cresol novolac.

The acid anhydride-type curing agent may be one known in the art, and examples thereof include phthalic anhydride, trimellitic anhydride, pyromellitic anhydride, maleic anhydride, tetrahydrophthalic anhydride, methyltetrahydrophthalic anhydride, methylnadic anhydride, hexahydrophthalic anhydride, and methylhexahydrophthalic anhydride.

These curing agents may be used alone or in combination of two or more. In addition, a curing accelerator may also be appropriately used to an extent that does not diminish effects of the present invention. The curing accelerator may be any of a variety of curing accelerators, examples of which include phosphorus compounds, tertiary amines, imidazoles, metal salts of an organic acid, Lewis acids, and amine complex salts.

The curable resin composition of the present invention may undergo a curing reaction in the absence of a solvent or in the presence of a solvent. Examples of the solvent include benzene, toluene, xylene, ethyl acetate, acetone, methyl ethyl ketone, diethyl ether, tetrahydrofuran, methyl acetate, acetonitrile, chloroform, methylene chloride, carbon tetrachloride, 1,2-dichloroethane, 1,1,2-trichloroethane, tetrachloroethylene, N-methylpyrrolidone, isopropyl alcohol, isobutanol, and t-butyl alcohol.

In the curable resin composition used for the present invention, it is preferable that the combination ratio between the epoxy resin and the curing agent be such that active groups in the curing agent are present in an amount of 0.7 to 1.5 equivalent weights per equivalent weight of total epoxy groups in the epoxy resin component, because excellent curing properties are achieved and a cured product having excellent thermal resistance and chemical resistance can be obtained.

It is preferable that the curable resin composition used for the present invention be in liquid form at normal pressure and at a temperature ranging from room temperature to 80° C. because workability in production is excellent. Furthermore, it is more preferable that the curable resin composition be in liquid form at normal pressure and room temperature. Accordingly, the curing method may be either room temperature curing or thermal curing.

The hollow fiber membrane module of the present invention can be produced as follows. Hollow fiber membranes are loaded into the tubular body, both ends of the hollow fiber membranes and the tubular body are sealed together by using the curable resin composition including the epoxy resin described above and by curing the composition, and the caps are attached to both ends of the tubular body.

In the production method of the present invention, first, hollow fiber membranes are loaded into the tubular body. The method for loading may be either of the following: hollow fibers are bundled together such that a predetermined membrane area is obtained and then loaded; or hollow fibers are arranged to form a reed-screen shape and rolled up such that a predetermined membrane area is obtained and then loaded.

Next, to secure both end portions of the hollow fibers onto the tubular body, both ends of the hollow fibers and the tubular body are sealed together with the curable resin composition. Any of a variety of methods may be employed, examples of which include methods involving room temperature curing and subsequent post curing (after-cure treatment), methods involving thermal curing at a temperature greater than or equal to 50° C., methods involving addition of a reaction accelerator for curing, and combinations of any of these. Methods involving room temperature curing and subsequent post curing (after-cure treatment) may be preferable methods because the Tg and crosslink density of the cured product of the curable resin composition can be improved. Post curing (after-cure treatment), if performed, may be performed at a temperature within a range of not lower than 45° C. or preferably not lower than 60° C., and, to ensure that the porous structure of the hollow fiber membranes, particularly membrane pore diameter, is maintained, the post curing may be performed at a temperature within a range of not higher than 150° C., not higher than 80° C., or preferably not higher than 70° C.

The method for sealing the seal portions for securing both end portions of the hollow fibers to the tubular body may be centrifugal molding or stationary molding. In centrifugal molding, molding is carried out by pouring the curable resin composition into the tubular body, in which the hollow fiber bundle is housed and loaded, while applying a centrifugal force in a longitudinal direction of the hollow fiber bundle. In stationary molding, the curable resin composition is poured into the tubular body in a state in which the hollow fiber bundle is loaded and held stationary in the tubular body.

In the case of sealing the liquid contacting portion, exclusively, of the end seal portion with the cured product of the curable resin composition of the present invention, the method may be as follows, for example. While the hollow fiber membranes are held vertical, the periphery of an end portion of the hollow fiber membranes is placed in a vessel that has an inside diameter smaller than the inside diameter of the casing and which is made of a material having high release properties, such as silicon rubber. A sealant different from the curable resin composition of the present invention is poured and left to stand for securement. Next, the hollow fiber membrane, with the end portion secured with the different sealant, is inserted into the casing, and the curable resin composition of the present invention is then poured and cured.

The caps can be attached to both ends of the tubular body produced as described above. Attaching the caps to the caps can be accomplished by, for example, threaded engagement, fitting engagement, adhesive bonding, or the like. The cap may have a tapered shape in which the diameter decreases with increasing distance from the tubular body. In addition, an opening for supplying or discharging a fluid may be formed in a tip end portion of the cap.

In the hollow fiber membrane module of the present invention, at least the liquid contacting portion of the end seal portion is formed of the cured product of the curable resin composition including the epoxy resin, which has a melt viscosity that provides excellent workability, and therefore, the curable resin composition has high ability to penetrate between bundled hollow fiber membranes, and thus uniform loading of resin components is achieved. Also, the crosslink density and thermal resistance (glass transition temperature) are high, and as a result, when liquid-liquid or gas-liquid separation or mixing is performed, even if a component, such as a radical polymerizable compound, that has a strong effect in causing dissolution or swelling of the resin that forms the seal portion is treated, the liquid contacting portion is inhibited from having reduced thermal resistance and from dissolving or swelling, which may otherwise be caused by a component such as an organic solvent or a radical polymerizable compound, and therefore the occurrence of cracking in the seal portion is inhibited.

The hollow fiber membrane module of the present invention has the characteristics described above and is therefore suitable for use as a degassing module for use in an ink jet printer. As illustrated in FIG. 1, an ink jet printer 11, used for the present invention, primarily includes an ink reservoir 12, an ink jet head 13, a first ink supply tube 14, a second ink supply tube 15, a hollow fiber membrane module 1, a suction pump 16, and an inlet tube 17. The ink reservoir 12 is configured to store ink and may be an ink tank, for example. The ink jet head 13 is configured to directly eject droplets of ink onto a printing medium. The first ink supply tube 14 is configured to receive ink supplied from the ink reservoir 12. The second ink supply tube 15 is configured to supply ink to the ink jet head 13. The hollow fiber membrane module 1, according to an embodiment, is attached to the first ink supply tube 14 and the second ink supply tube 15 and is configured to degas ink. The suction pump 16 is configured to perform evacuation. The inlet tube 17 connects the suction pump 16 to the degassing module 1. The first ink supply tube 14 and the second ink supply tube 15 form an ink flow path extending from the ink reservoir 12 to the ink jet head 13. The ink used in the ink jet printer 11 is not particularly limited. Examples of the ink include aqueous inks, UV inks, solvent inks, and ceramic inks. Organic solvent inks and ceramic inks may be particularly preferable because, as described above, even when an organic solvent is treated, swelling of the cured product due to a decreased glass transition temperature of the liquid contacting portion is inhibited and the occurrence of cracking in the seal portion is inhibited.

The method for degassing ink by using the hollow fiber degassing module 1 is as follows. Specifically, ink supplied from the ink reservoir 12 to the first ink supply tube 14 is supplied to the interior of a first cap 6 through a supply port 6a, illustrated in FIG. 2. The ink supplied to the interior of the first cap 6 is supplied to a hollow portion 3c of the membrane bundle through a communication port 8a. The ink supplied to the hollow portion 3c of the membrane bundle flows outwardly in a radial direction of a tubular body 5, through spaces between hollow fiber membranes 2, which form a hollow fiber membrane bundle 3. That is, in the tubular body 5, the ink supplied to the hollow portion 3c of the membrane bundle is supplied to the outside of the hollow fiber membranes 2. During this time, by actuating the suction pump 16 to apply suction to the interior of a module 4 through an inlet port 7a, the inside of the hollow fiber membranes 2 is depressurized. Accordingly, while the ink passes through spaces between the hollow fiber membranes 2, dissolved gas and gas bubbles in the ink are drawn to the inside of the hollow fiber membranes 2. In this manner, degassing of ink is carried out.

Subsequently, the degassed ink flows into the second ink supply tube 15 through a discharge port 5d and is supplied to the ink jet head 13 from the second ink supply tube 15. An ink jet printer 11 in which ink is supplied from the ink reservoir 12 to the ink jet head 13 may be equipped with the hollow fiber degassing module 1 so that ink can be supplied to the ink jet head 13 by utilizing the weight of the ink.

Here, examples of radical polymerizable compounds that may be used in the ink include (meth)acrylate compounds and N-vinyl compounds. Examples of the (meth)acrylate compound include 2-phenoxyethyl acrylate, cyclic trimethylolpropane formal acrylate, t-butyl cyclohexyl acrylate, trimethylolpropane triacrylate, and ethoxyethoxy ethyl acrylate. Examples of the N-vinyl compound include compounds containing an N-vinyl group ($CH_2$=CH—N<), such as N-vinylformamide, N-vinylacetamide, N-methyl-N-vinylacetamide, N-methyl-N-vinylformamide, N-vinylpyrrolidone, N-vinylcaprolactam, N-vinylvalerolactam, and N-vinylimidazole.

Here, the organic solvent used in the ink is not particularly limited provided that effects of the present invention are not diminished and may be one known in the art. Specific examples of the organic solvent include: glycols, such as ethylene glycol, diethylene glycol, and triethylene glycol; glycol monoalkyl ethers, such as 3-methoxy-3-methyl butanol and 3-methoxybutanol; glycol dialkyl ethers, such as diethylene glycol diethyl ether, diethylene glycol methyl ethyl ether, diethylene glycol methyl butyl ether, triethylene glycol methyl butyl ether, and tetraethylene glycol dimethyl ether; glycol monoacetates, such as ethylene glycol monobutyl ether acetate, diethylene glycol monobutyl ether acetate, and propylene glycol monomethyl ether acetate; glycol diacetates; alcohols, such as ethanol, n-propanol, isopropanol, n-butanol, 2-butanol, and 2-methyl-1-propanol; ketones, such as acetone, methyl ethyl ketone, methyl n-propyl ketone, methyl isopropyl ketone, methyl n-butyl ketone, methyl isobutyl ketone, methyl n-amyl ketone, methyl isoamyl ketone, diethyl ketone, ethyl n-propyl ketone, ethyl isopropyl ketone, ethyl n-butyl ketone, ethyl isobutyl ketone, di-n-propyl ketone, diisobutyl ketone, cyclohexanone, methylcyclohexanone, and isophorone; acetic acid esters, such as methyl acetate, ethyl acetate, n-propyl acetate, isopropyl acetate, n-butyl acetate, isobutyl acetate, hexyl acetate, octyl acetate, 2-methylpropyl acetate, and 3-methylbutyl acetate; lactic acid esters, such as methyl lactate, ethyl lactate, and butyl lactate; saturated hydrocarbons, such as n-hexane, isohexane, n-nonane, isononane, dodecane, and isododecane; unsaturated hydrocarbons, such as 1-hexene, 1-heptene, and 1-octene; cyclic saturated hydrocarbons, such as cyclohexane, cycloheptane, cyclooctane, cyclodecane, and decalin; cyclic unsaturated hydrocarbons, such as cyclohexene, cycloheptene, cyclooctene, 1,1,3,5,7-cyclooctatetraene, and cyclododecene; aromatic hydrocarbons, such as benzene, toluene, and xylene; terpenes; and nitrogen-containing solvents, example of which include cyclic imides, 3-alkyl-2-oxazolidinones, such as 3-methyl-2-oxazolidinone and 3-ethyl-2-oxazolidinone, N-alkylpyrrolidones, such as N-methyl-2-pyrrolidone and N-ethyl-2-pyrrolidone, lactones, such as γ-butyrolactone and ε-caprolactone, and β-alkoxypropionamides.

The ink used for the present invention may include, as necessary, in addition to the components described above, one or more components known in the art. Examples of such components include colorants (organic pigments, inorganic pigments, and dyes), dispersants, polymerization initiators such as radical polymerization initiators, polymerization inhibitors, sensitizers, co-sensitizers, UV absorbers, antioxidants, anti-fading agents, electrically conductive salts, fluxes, polymeric compounds, basic compounds, surfactants, leveling additives, and matting agents.

The above-described example of the hollow fiber degassing module 1 according to the present embodiment is of the external perfusion type, in which ink is supplied to the outside of the hollow fiber membranes 2 and the inside of the hollow fiber membranes 2 is depressurized, thereby degassing ink. Alternatively, the hollow fiber degassing module 1 may be of the internal perfusion type, in which ink is supplied to the inside of the hollow fiber membranes and the outside of the hollow fiber membranes is depressurized, thereby degassing ink.

EXAMPLE

Next, examples of the present invention will be described, but the present invention is not limited to the examples described below.

(Test Methods) Measurement of Tg and Crosslink Density

Using test samples, Tg was measured by DSC, and crosslink density was measured by DMA.

The conditions for DSC measurement of Tg were as follows.
Instrument Mettler Toledo DSC822e, manufactured by Mettler Toledo International Inc.
Measurement Temperature
  Condition 1 35 to 0° C.
    1st run 0 to 260° C. 10° C./min
    2nd run 0 to 200° C. 10° C./min
  Condition 2 1st run −30 to 180° C. 10° C./min
    2nd run −30 to 180° C. 10° C./min
Sample pan SII aluminum
Measured weight 5 mg
Atmosphere nitrogen
The conditions for DMA measurement of crosslink density were as follows.
Instrument DMS6100-2, manufactured by Hitachi High-Tech Science Corporation
Measurement Conditions
  Measurement temperature range: room temperature to 150° C.
  Rate of temperature increase 3° C./min
  Stress control 25 μm
  Frequency 1 Hz
Atmosphere nitrogen (200 ml/min)
The dynamic viscoelasticity of the cured product was measured in a dual cantilever bending mode, and the crosslink density (mmol/ml) of the cured product was measured.

(Test Method) Sample Immersion Test

Test samples were immersed in three types of liquid chemicals at 45° C. for 90 days. The weights before and after immersion were measured, and the rate of the change in the weight relative to the weight before immersion was calculated.
Liquid A: MEK
Liquid B: UV curable ink-jet ink (containing 27 parts by mass of 2-phenoxyethyl acrylate, 50 parts by mass of N-vinylcaprolactam, 7 parts by mass of propoxylated neopentylglycol diacrylate, 3 parts by mass of ethoxylated trimethylolpropane triacrylate, 3 parts by mass of Irgacure 907 (manufactured by Ciba Japan K.K.), 5 parts by mass of Irgacure 819, and 5 parts by mass of a colorant (carbon black).
Liquid C: Photoresist thinner (propylene glycol monomethyl ether/propylene glycol monomethyl ether acetate=70 wt %/30 wt %)

Examples 1 to 5 and Comparative Examples 1 and 2

Curable resin compositions containing base resins and a curing agent shown in Table 1 were prepared and then held at 25° C. for 17 hours for curing. Thereafter, for after-cure treatment, heating was performed at 60° C. for 17 hours to produce test samples of 4 mm×50 mm×2 mm.

A DSC measurement of Tg, a DMA measurement of crosslink density, and a sample immersion test were conducted on the obtained test samples. The results are shown in Table 1.

TABLE 1

| | | Example | | | | | Comparative example | |
|---|---|---|---|---|---|---|---|---|
| | | 1 | 2 | 3 | 4 | 5 | 1 | 2 |
| Base resin | S1 | 30 | 30 | 30 | 20 | 50 | | |
| | S2 | 70 | 70 | 70 | 80 | 50 | 100 | 34.5 |
| | S3 | | | | | | | 65.5 |

TABLE 1-continued

|  |  | Example | | | | | Comparative example | |
|---|---|---|---|---|---|---|---|---|
|  |  | 1 | 2 | 3 | 4 | 5 | 1 | 2 |
| Curing agent | K1 | 19 |  |  | 19 | 32 |  |  |
|  | K2 |  | 20 |  |  |  |  |  |
|  | K3 |  |  | 29 |  |  | 28 |  |
|  | K4 |  |  |  |  |  |  | 5 |
| Tg (° C.) |  | 90 | 91 | 80 | 85 | 94 | 61 | 58 |
| Crosslink density |  | 4.0 | 4.0 | 3.3 | 3.7 | 4.1 | 2.6 | 2.5 |
| Immersion (Swelling ratio after 90 days) | Liquid A | 0.88 | 0.93 | 1.77 | 1.24 | 0.56 | 5.93 | 6.30 |
|  | Liquid B | 0.50 | 0.53 | 1.01 | 0.71 | 0.32 | 3.39 | 3.6 |
|  | Liquid C | 0.33 | 0.35 | 0.67 | 0.47 | 0.21 | 2.26 | 2.40 |

The compositional ratios in the table are expressed in parts by mass. The components used, indicated by symbols, are as follows.

S1 Described in "(Production example)" below. (epoxy equivalent weight 164 g/eq)
S2 EPICOAT 828, bisphenol epoxy resin manufactured by Yuka-Shell Epoxy Co., Ltd. (epoxy equivalent weight 188 g/eq)
S3 FLEP 10, polysulfide-modified epoxy resin manufactured by Toray Thiokol Co., Ltd
K1 1,3-bis(aminomethyl)cyclohexane (active hydrogen equivalent weight 35.5 g/eq)
K2 m-xylenediamine (active hydrogen equivalent weight 34 g/eq)
K3 PACM, cycloaliphatic polyamine curing agent manufactured by BTR Japan (active hydrogen equivalent weight 52.6 g/eq)
K4 Anchor 1170, BF3-modified amine complex manufactured by BTR Japan (Measurement Method) Destructive Testing of Hollow Fiber Membrane Module by Using Ink Using an ink jet printer as illustrated in FIG. 1, three types of liquid chemicals, which were the same as those described above, were introduced into prepared hollow fiber membrane modules. The temperature of the liquid at the time of the degassing treatment in the hollow fiber membranes was set to 80° C., and the time until cracking occurred was measured.

Examples 6 to 10 and Comparative Examples 3 and 4

A bundle of 72000 non-homogeneous hollow fiber membranes, made from poly-4-methyl-pentene-1, each having an inside diameter of 100 μm, an outside diameter of 190 μm, and a length of 230 mm, was prepared, and the bundle was loaded into a tubular body (made from polyphenylene ether) having an inside diameter of 77 mmφ, an outside diameter of 89 mmφ, and a length of 230 mm.

Next, both end portions were sealed with a curable resin composition and secured. Specifically, base resins and a curing agent shown in Table 2 were used in each of the curable resin compositions, which was poured to one of the end portions at room temperature and was then left to stand and allowed to cure for approximately 3 hours. Next, the curable resin composition was poured to the other end portion and was allowed to cure in a similar manner. Subsequently, post curing was performed at 60° C. for 15 hours. Next, at the end portion of the hollow fiber membrane bundle, a portion tightly secured with the cured product of the curable resin composition was cut perpendicular to the longitudinal direction of the fiber bundle and was opened.

Figure 2:
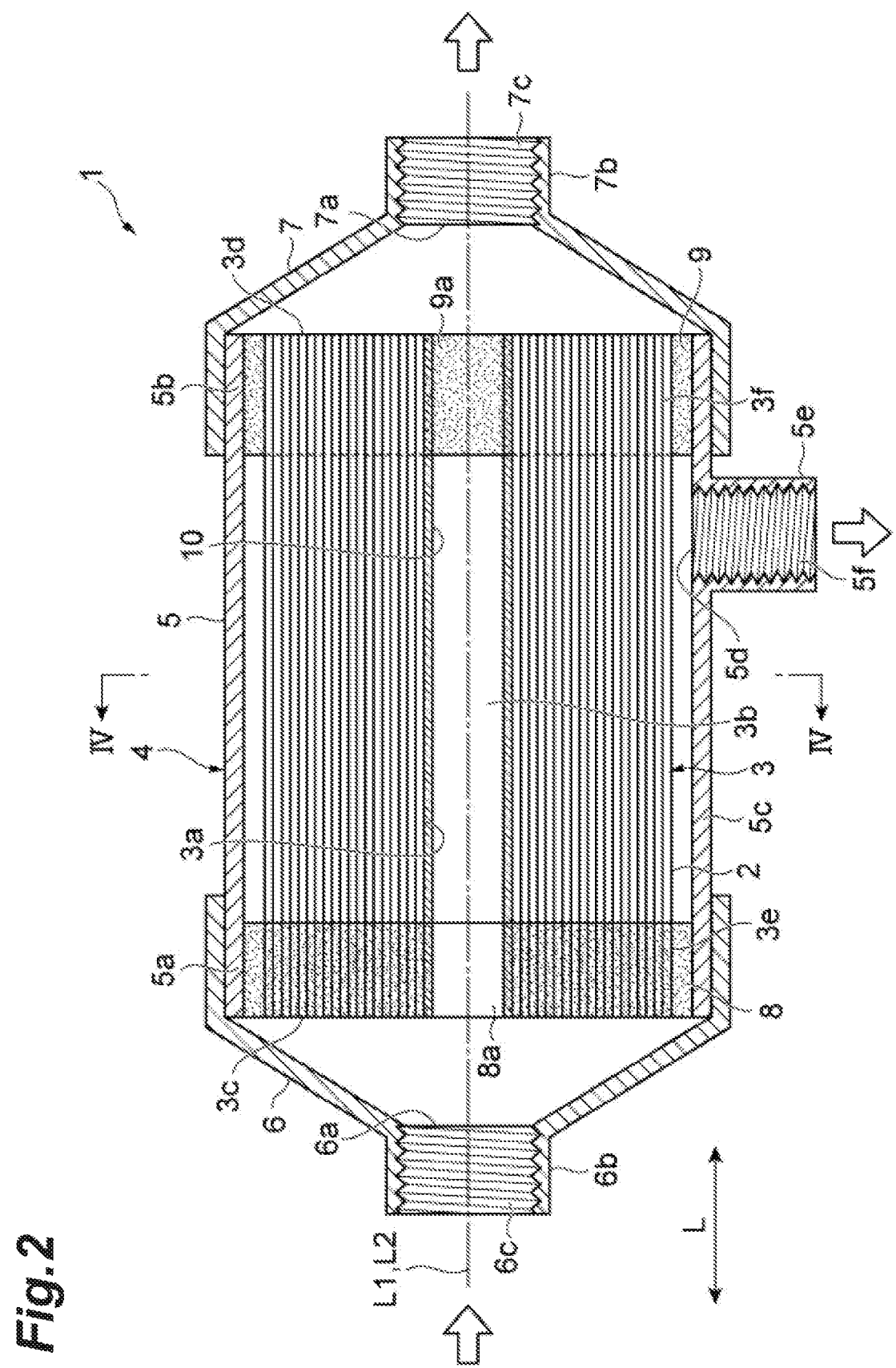
FIG. 2 is a schematic cross-sectional view of a hollow fiber membrane module according to the present invention.
Figure 3:
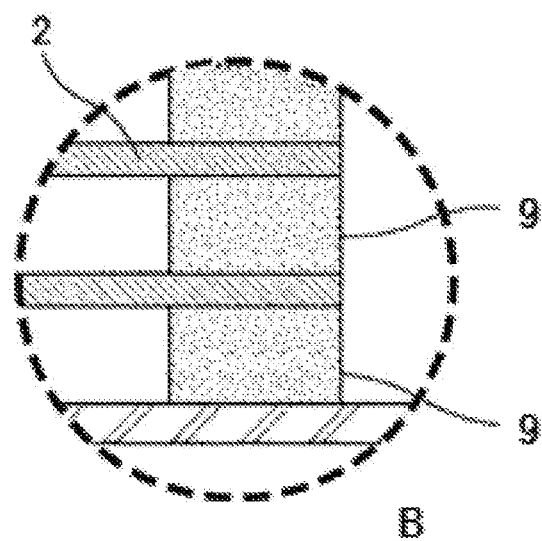
FIG. 3 is a partially enlarged view illustrating an example of a seal portion of an end seal portion illustrated in FIG. 2. The entirety of the seal portion is sealed with the cured product of a curable resin composition including an epoxy resin of the present invention.
Figure 4:
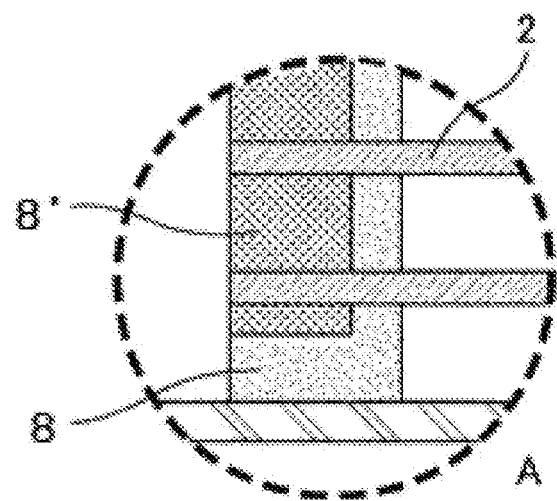
FIG. 4 is a partially enlarged view illustrating an example of a seal portion of the end seal portion illustrated in FIG. 2. The liquid contacting portion of the seal portion is exclusively sealed with the cured product of a curable resin composition including an epoxy resin of the present invention.

Caps (made from polyphenylene ether) were attached to the tubular body in which the hollow fiber membranes were loaded, thereby producing an external perfusion-type hollow fiber membrane module such as illustrated in FIG. 2. Destructive testing of a hollow fiber membrane module by using ink was conducted on the prepared hollow fiber membrane modules. The results are shown in Table 2.

TABLE 2

|  |  | Example | | | | | Comparative example | |
|---|---|---|---|---|---|---|---|---|
|  |  | 6 | 7 | 8 | 9 | 10 | 3 | 4 |
| Base resin | S1 | 30 | 30 | 30 | 20 | 50 |  |  |
|  | S2 | 70 | 70 | 70 | 80 | 50 | 100 | 34.5 |
|  | S3 |  |  |  |  |  |  | 65.5 |
| Curing agent | K1 | 19 |  |  | 19 | 32 |  |  |
|  | K2 |  | 20 |  |  |  |  |  |
|  | K3 |  |  | 29 |  |  | 28 |  |
|  | K4 |  |  |  |  |  |  | 5 |
| Time until cracking occurred | Liquid A | 19 days | 18 days | 11 days | 12 days | 19 days | 4 days | 4 days |
|  | Liquid B | 45 days | 44 days | 25 days | 40 days | 47 days | 7 days | 7 days |
|  | Liquid C | 30 days | 31 days | 22 days | 26 days | 35 days | 3 days | 3 days |

(Production Example) Production of Epoxy Resin S1

Measurement of Epoxy Equivalent Weight
The measurement was conducted in accordance with JIS K 7236.
Method for Measurement of Melt Viscosity at 150° C.
The measurement was conducted with an ICI viscometer in accordance with ASTM D4287.
GPC Measurement Conditions
Instrument: HLC-8220 GPC, manufactured by Tosoh Corporation
Column: HXL-L, guard column manufactured by Tosoh Corporation
    TSK-GEL G2000HXL, manufactured by Tosoh Corporation
    TSK-GEL G2000HXL, manufactured by Tosoh Corporation
    TSK-GEL G3000HXL, manufactured by Tosoh Corporation
    TSK-GEL G4000HXL, manufactured by Tosoh Corporation
Detector: RI (differential refractometer)
Data processing: GPC-8020 Model II Version 4.10, manufactured by Tosoh Corporation
Measurement Conditions:
    Column temperature 40° C.
    Developing solvent tetrahydrofuran
    Flow rate 1.0 ml/min
Standard: The following monodisperse polystyrenes, whose molecular weights are known, were used in accordance with the measurement manual of GPC-8020 Model II version 4.10, mentioned above.
    (Polystyrenes Used)
    A-500, manufactured by Tosoh Corporation
    A-1000, manufactured by Tosoh Corporation
    A-2500, manufactured by Tosoh Corporation
    A-5000, manufactured by Tosoh Corporation F-1, manufactured by Tosoh Corporation
F-2, manufactured by Tosoh Corporation
F-4, manufactured by Tosoh Corporation
F-10, manufactured by Tosoh Corporation
F-20, manufactured by Tosoh Corporation
F-40, manufactured by Tosoh Corporation
F-80, manufactured by Tosoh Corporation
F-128, manufactured by Tosoh Corporation Sample: a 1.0 mass % (on a resin solids basis) tetrahydrofuran solution was filtered through a microfilter to obtain samples (50 µl).

Production of Triphenylmethane-Type Resin (1)

Under nitrogen gas purging, into a flask equipped with a thermometer, a dropping funnel, a condenser tube, and a stirrer were loaded 122 g of salicylaldehyde, 940 g of phenol, and 2.4 g of p-toluenesulfonic acid. The temperature was increased to 100° C., and a reaction was allowed to take place for 5 hours with stirring. After reaction, the temperature was lowered to 80° C., and thereafter, 1.4 g of a 49 mass % aqueous solution of sodium hydroxide was added to neutralize the catalyst, thereby completely terminating the reaction. Subsequently, excess phenol was distilled off under reduced-pressure conditions to yield 280 g of a triphenylmethane-type resin (1). The softening point of the resulting triphenylmethane-type resin (1) was 117° C., and the hydroxyl group equivalent weight thereof was 97 g/eq.

Production of Epoxy Resin S1

Under nitrogen gas purging, into a flask equipped with a thermometer, a condenser tube, and a stirrer were loaded 97 g of the triphenylmethane-type resin (1) (hydroxyl group content: 1 mole), 555 g (6.0 moles) of epichlorohydrin, 111 g of n-butanol, and 17 g of water, which were dissolved. After the temperature was increased to 50° C., 220 g of a 20 mass % aqueous solution of sodium hydroxide (amount of sodium hydroxide: 1.10 moles) was added over a time period of 3 hours and further reacted at 50° C. for 1 hour. After reaction, unreacted epichlorohydrin was distilled off at 150° C. under reduced-pressure conditions to yield a crude product. 300 g of methyl isobutyl ketone and 50 g of n-butanol were added to the resulting crude product and dissolved, 15 g of a 10 mass % aqueous solution of sodium hydroxide was then added, and a reaction was carried out at 80° C. for 2 hours. After completion of the reaction, water washing was performed three times using 100 g of water, and the pH of the wash solution was confirmed to be neutral. Next, the system was dehydrated by azeotropic distillation and subjected to microfiltration, and solvent was distilled off under reduced-pressure conditions to yield 150 g of an epoxy resin (1). The epoxy equivalent weight of the epoxy resin (1) was 164 g/eq, and the ICI viscosity at 150° C. thereof was 60 mPa·s.

REFERENCE SIGNS LIST

1 . . . Hollow fiber degassing module, 2 . . . Hollow fiber membrane, 3 . . . Hollow fiber membrane bundle, 3a . . . Inner circumferential surface, 3b . . . Hollow portion, 3c . . . First-side end face, 3d . . . Second-side end face, 3e . . . First-side membrane bundle end portion, 3f . . . Second-side membrane bundle end portion, 4 . . . Housing, 5 . . . Tubular body, 5a . . . First-side open end portion, 5b . . . Second-side open end portion, 5c . . . Side wall, 5d . . . Discharge port, 5e . . . Connection portion, 5f . . . Internal thread, 6 . . . First cap, 6a . . . Supply port, 6b . . . Connection portion, 6c . . . Internal thread, 7 . . . Second cap, 7a . . . Inlet port, 7b . . . Connection portion, 7c . . . Internal thread, 8 . . . Seal portion (liquid contacting portion), 8' . . . Seal portion (liquid non-contact portion), 8a . . . Communication port, 9 . . . Seal portion, 10 . . . Support, 101 . . . Linear portion, 101a . . . First linear portion, 101b . . . Second linear portion, 102 . . . Mesh, 11 . . . Ink jet printer, 12 . . . Ink reservoir, 13 . . . Ink jet head, 14 . . . First ink supply tube, 15 . . . Second ink supply tube, 16 . . . Suction pump, 17 . . . Inlet tube, L . . . Axial direction, L1 . . . Central axis of hollow fiber membrane bundle, L2 . . . Central axis of tubular body

The invention claimed is:

1. A hollow fiber membrane module at least comprising:
a tubular body;
a cap;
a hollow fiber membrane; and
an end seal portion,
wherein at least a liquid contacting portion of the end seal portion is sealed with a cured product of a curable resin composition including an epoxy resin, and
wherein the epoxy resin includes a polyglycidyl ether of a polycondensate of a first aromatic compound containing a phenolic hydroxyl group and a second aromatic compound containing a formyl group and a phenolic hydroxyl group.

2. The hollow fiber membrane module according to claim 1, wherein the epoxy resin has an ICI viscosity at 150° C. ranging from 1 to 500 mPa·s.

3. The hollow fiber membrane module according to claim 1, wherein the epoxy resin has an epoxy equivalent weight within a range of 230 g/eq or less.

4. The hollow fiber membrane module according to claim 1, wherein the curable resin composition comprises a curing agent.

5. The hollow fiber membrane module according to claim 1, wherein the hollow fiber membrane is configured to degas an ink-jet ink including an organic solvent.

6. A method for producing a hollow fiber membrane module at least including a tubular body, caps, a hollow fiber membrane, and end seal portions, the method comprising:
loading the hollow fiber membrane into the tubular body;
sealing end portions of the hollow fiber membrane to the tubular body by curing a curable resin composition including an epoxy resin; and
attaching the caps to both ends of the tubular body,
wherein the epoxy resin includes a polyglycidyl ether of a polycondensate of phenol and hydroxybenzaldehyde.

7. The method for production according to claim 6, wherein the curable resin composition is cured at room temperature and is thereafter subjected to post curing at 50° C. or higher.

8. The hollow fiber membrane module according to claim 1, wherein the hollow fiber membrane is configured to degas an ink-jet ink including a radical polymerizable compound.

9. The hollow fiber membrane module according to claim 8, wherein the radical polymerizable compound comprises a (meth)acrylate compound or an N-vinyl compound.

10. The hollow fiber membrane module according to claim 1, wherein the first aromatic compound and the second aromatic compound are represented, respectively, by general formula (1) and (2) below,

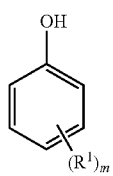

(1)

-continued
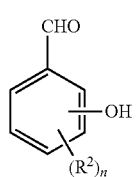
(2)
wherein, $R^1$ and $R^2$ are each independently a hydrogen atom, a hydrocarbon group having 1 to 4 carbon atoms, an alkoxy group having 1 to 4 carbon atoms, or a halogen atom, m is an integer from 1 to 3, and n is an integer from 1 to 4.
* * * * *